S. C. SALISBURY.
Gas Furnace.
No. 68,119.  Patented Aug. 27, 1867.
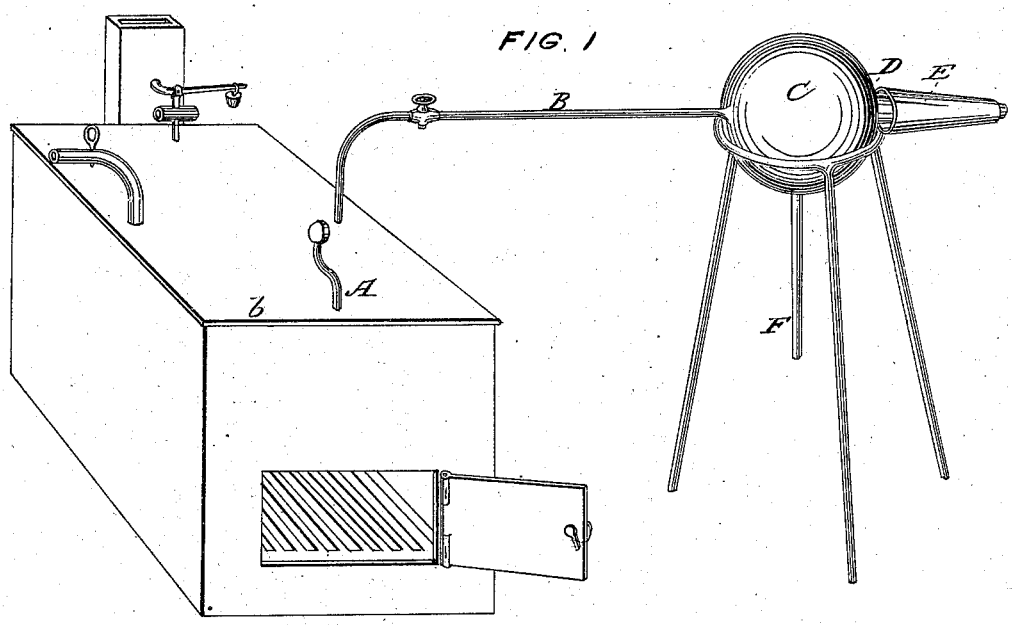
FIG. 2
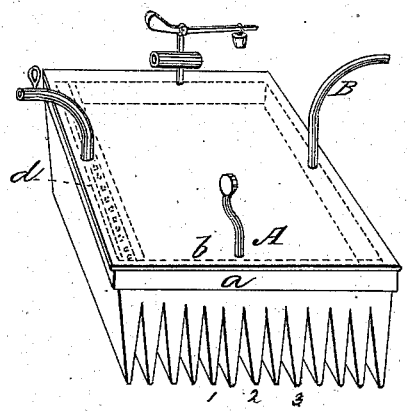
FIG. 3
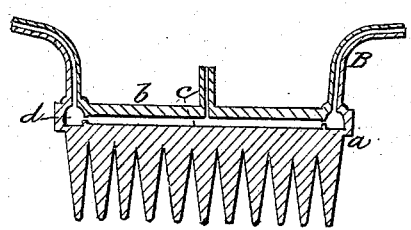
WITNESSES:
INVENTOR:

United States Patent Office.

SILAS C. SALISBURY, OF NEW YORK, N. Y.

Letters Patent No. 68,119, dated August 27, 1867.

---

IMPROVED APPARATUS FOR SUPPLYING GASES TO FURNACES.

---

*The Schedule referred to in these Letters Patent and making part of the same.*

---

TO ALL WHOM IT MAY CONCERN:

Be it known that I, SILAS C. SALISBURY, of the city of New York, in the county of New York, and State of New York, have invented a new and improved Machine or Apparatus for Supplying Different Gases, in connection with the Air-Blast, to Blast and Similar Furnaces; and I do hereby declare that the following is a full, clear, and exact description thereof, and of its mode or manner of operation, reference being had to the accompanying drawings, and to the letters of reference marked thereon, and making a part of this specification.

My invention consists in a new apparatus or combination of mechanism for supplying to blast and other furnaces gases of different kinds, in combination with the air-blast.

Figure 1 is a general view of the combined apparatus or mechanism used for such purpose.

Figure 2 is a detached view of the gas or steam-generator, used as a part of such apparatus.

Figure 3 is a sectional view of such generator.

For supplying the air-blast to blast and similar furnaces, and forcing such blast into the furnace, as this has heretofore been accomplished, blowing engines, often of great power, are used and required.

My apparatus is adapted to supply, in combination with the air-blast, different kinds of gases at the same time, and with reduced power of blowing engines, but has been more particularly designed and arranged with reference to supplying to blast and other furnaces, with the air-blast, highly-heated hydrogen and oxygen gases, or their equivalent, together with hydrocarbon gas. Such apparatus or mechanism consists of a cheap and compact gas or steam-generator, by which hydrogen and oxygen gases, or their equivalent, can be highly heated, and also supplied under great pressure to the furnace, in combination with an exhaust or vacuum-chamber, into and through which such gases pass, and into which the hydrocarbon gas enters, and is there mixed with the other gases, which then pass together into the tuyere which takes the hot-air blast.

The generator, A, consists of two flat metallic plates, $a$ $b$, one above the other, firmly secured together, and between which there is a shallow open space for the reception of water or steam or any fluid. By such construction a flat evaporating surface is secured, which is most favorable for evaporating and heating purposes. Such plates are also to be thick enough to bear safely any pressure to which they may be subjected. Into the open space between such plates is supplied the water or steam which is to be heated therein to a temperature of from 700° to 800° or 900° Fahrenheit. The water or steam, however, instead of being supplied directly into the evaporating-chamber $c$, is supplied to a pipe or conduit, $d$, extending along one side of the evaporating-chamber, and connecting therewith by numerous small holes or orifices, through which the water or steam passes into the evaporating-chamber, and a much more rapid evaporation and heating secured. Such orifices should be quite small, so as to finely divide the current of water, and close together, so as to more effectually distribute it over the evaporating surface. A continuous narrow slot or opening will answer the same purpose as a series of such small orifices. The steam or gases, after being thus heated, pass from the evaporating or heating-chamber by a pipe to the exhaust or vacuum-chamber C. Before passing, however, to such vacuum-chamber C, such gases are subjected, in the generating-chamber, to a pressure of from fifteen to twenty pounds to the square inch, or sufficient to force them into the furnace. As a flat surface will evaporate water much more rapidly than heat can under ordinary circumstances be imparted to it, the fire-surface of the evaporating-plate $a$ is greatly increased by forming on its under surface a series of projections or ribs, 1, 2, 3, which, for a plate having from fifteen to twenty square feet, may be about half an inch thick by five or six inches long, and extend down over or into the furnace. By such form of construction heat is imparted to the evaporating surface as rapidly as it is required. The steam or gases from the generator A enter the vacuum-chamber C under pressure through the pipe B, which enters within such chamber and terminates opposite the mouth of the discharge pipe D, or enters within the expanded mouth of such pipe D, and such discharge pipe D, in turn, passes within the tuyere E, which enters the furnace. Into the vacuum-chamber C also enters a pipe, F, leading from the retort in which the hydrocarbon gas is generated. As the gases, under pressure, pass from the generator A into the pipe D, a vacuum is produced in the chamber C, causing the hydrocarbon gas to enter such chamber, where it is mixed with the steam or hydrogen and oxygen, and forced with them through the discharge pipe D into the furnace. Into the mouth of the tuyere E, and about the tube D, the ordinary hot-air blast is caused to enter. Such air-blast, or a part thereof, may also be taken or admitted into the vacuum-chamber C, and carried from thence, mixed with the other gases, to the furnace. The steam or hydrogen and oxygen gases entering the tuyere under great pressure, are forced into the furnace, together with the hydrocarbon gas, by such pressure, which also materially assists in forcing the hot-air blast, so that but comparatively little additional power is required for blowing engines, thus effecting a great saving in cost of engines, and of fuel for operating them. The pressure to which the steam or hydrogen and oxygen is to be subjected, should be such that these gases will pass into the furnace with greater force or pressure than does the air-blast, so that they will not be forced back by such blast. The relative proportions of the hydrogen and oxygen gases, and of the hydrocarbon gas, will vary somewhat, according to the character of the iron, but the use of about thirty gallons of water to about two gallons of hydrocarbon oil for producing such gases, will generally be found satisfactory.

What I claim as my invention, and desire to secure by Letters Patent, is—

The combination of the generator A and exhaust-chamber or mixer C, with the tuyere E, or its equivalent, for generating and heating, mixing and supplying to blast and other furnaces, hydrogen and oxygen gases, or their equivalent, and carbon gas or other gases, in connection with the air-blast, for the purposes set forth.

S. C. SALISBURY.

Witnesses:
  S. D. LAW,
  FRED. B. SEARS.